United States Patent
Li et al.

(10) Patent No.: US 10,951,361 B2
(45) Date of Patent: Mar. 16, 2021

(54) IOV LOW LATENCY COMMUNICATION METHOD, TERMINAL AND SYSTEM

(71) Applicant: SHANGHAI RESEARCH CENTER FOR WIRELESS COMMUNICATIONS, Shanghai (CN)

(72) Inventors: Qiang Li, Shanghai (CN); Yong Zhang, Shanghai (CN); Peihao Xie, Shanghai (CN); Fei Shen, Shanghai (CN); Wuxiong Zhang, Shanghai (CN)

(73) Assignee: SHANGHAI RESEARCH CENTER FOR WIRELESS COMMUNICATIONS, Shanghai (CN)

( * ) Notice: Subject to any disclaimer, the term of this patent is extended or adjusted under 35 U.S.C. 154(b) by 20 days.

(21) Appl. No.: 16/236,144

(22) Filed: Dec. 28, 2018

(65) Prior Publication Data
US 2020/0162199 A1    May 21, 2020

(30) Foreign Application Priority Data
Nov. 18, 2018 (CN) .......................... 201811371247.9

(51) Int. Cl.
| H04L 1/18 | (2006.01) |
| H04W 4/40 | (2018.01) |
| H04L 12/40 | (2006.01) |
| H04W 28/06 | (2009.01) |
| H04W 28/16 | (2009.01) |
| H04W 72/12 | (2009.01) |

(52) U.S. Cl.
CPC ............ *H04L 1/1812* (2013.01); *H04L 12/40* (2013.01); *H04W 4/40* (2018.02); *H04W 28/06* (2013.01); *H04W 28/16* (2013.01); *H04W 72/1236* (2013.01); *H04L 2012/40273* (2013.01)

(58) Field of Classification Search
CPC .................. H04L 1/1812; H04L 12/40; H04L 2012/40273; H04L 67/12; H04L 67/32; H04W 28/06; H04W 28/16; H04W 4/40; H04W 72/1236
See application file for complete search history.

(56) References Cited

U.S. PATENT DOCUMENTS

| 2014/0023088 A1* | 1/2014 | Polk ....................... H04L 47/724 370/468 |
| 2018/0102985 A1* | 4/2018 | Byers ..................... H04L 47/823 |
| 2019/0004868 A1* | 1/2019 | Zhou ....................... G06F 9/505 |
| 2019/0116532 A1* | 4/2019 | Morihiro ............... H04W 36/38 |

* cited by examiner

*Primary Examiner* — Zhensheng Zhang
(74) *Attorney, Agent, or Firm* — Ladas & Parry, LLP

(57) ABSTRACT

The present invention discloses an Internet of Vehicles (IoV) low latency communication method and also discloses an IoV terminal and an IoV system for implementing the low latency communication method. The present invention uses a combination of a macro node and access points to perform resource scheduling on services requested by the IoV terminal and reduce a network transmission latency and ensure data transmission reliability through optimization of a data transmission manner, high-efficient processing at a data network side, and stable access of edge users by using technologies such as fog computing, open loop communication, path diversity, and network slicing.

12 Claims, 6 Drawing Sheets

IOV LOW LATENCY COMMUNICATION METHOD, TERMINAL AND SYSTEM

CROSS REFERENCE TO RELATED APPLICATION

The present application claims the priority to Chinese Patent Application No. 201811371247.9 filed on Nov. 18, 2018, the disclosure of which is incorporated herein by reference in its entirety.

BACKGROUND

Technical Field

The present invention relates to an Internet of Vehicles (IoV) low latency communication method, and at the same time, also relates to an IoV terminal and an IoV system for implementing the low-latency communication method, and belongs to the field of IoV technologies.

Related Art

IoV is one of key technologies for realizing a future intelligent transportation system, and is a result of merging a plurality of technologies such as the Internet of Things (IoT), intelligent transportation, Telematics, and cloud computing. V2X (Vehicle to X), as an important constituent part of an IoV technology, enables interaction and communication of vehicle to vehicle (V2V), vehicle to road (V2R), vehicle to infrastructure (V2I), and vehicle to pedestrian (V2P) to obtain a series of traffic information such as real-time road conditions, road information, and pedestrian information, so as to improve driving safety, reduce traffic jams, and enhance traffic efficiency.

With continuous development of the V2X technology, especially autonomous vehicles, higher requirements are proposed on a transmission and processing latency of real-time data. At the same time, demand for an ultra-low latency and highly reliable scenarios in 5G also proposes higher requirements on a latency of an air interface of data transmission, and the latency usually needs to be controlled to be lower than 10 ms. However, a transmission latency achieved in an existing Long Term Evolution (LTE)-based IoV technical solution is usually in a range of 50-100 ms. It brings a great challenge for safe driving of an autonomous vehicle in a high-speed movement scenario.

In the prior art, the LTE-based IoV technical solution is realized based on an LTE Device-to-Device (D2D) technology. However, LTE D2D performs no optimized design for an IoV application in the high-speed movement scenario. In a high-speed movement scenario, a time-variation of a channel becomes fast, resulting in non-stable channel characteristics. Mobility of a receiving end and a transmitting end of a link becomes quick, with a result that a Doppler spread of the channel and spatial consistency between channel parameters become more complicated and a channel environment becomes more complicated and uncertain. A conventional semi-static resource scheduling algorithm concept can reduce a data transmission latency, but may easily cause a lot of waste of cache resources due to rigid distribution of the cache resources. Therefore, the IoV using the LTE D2D technology cannot satisfy requirements of fast time-variation and a low latency of a channel in a high-speed movement scenario. Another problem to be resolved is fast handover. A vehicle moving at a high speed needs to pass through a handover area quickly when performing data handover, and a quicker movement speed leads to a shorter time to pass through the handover region. If the vehicle moves at such a high speed that a time for the vehicle to pass through the handover area is less than a minimum latency for processing handover by the IoV system, the handover process cannot be finished, and as a result, data transmission fails. Therefore, a new IoV access solution needs to be provided for an autonomous vehicle in a high-speed movement scenario, so as to satisfy actual demand of a user.

SUMMARY

In consideration of the defects of the prior art, the first technical problem to be resolved by the present invention is to provide an IoV low latency communication method.

Another problem to be resolved by the present invention is to provide an IoV terminal for implementing the low latency communication method.

Yet another problem to be resolved by the present invention is to provide an IoV terminal for implementing the low latency communication method.

In order to achieve the foregoing inventive objectives, the present invention uses the following technical solution.

According to a first aspect of the embodiment of the present invention, an IoV low latency communication method is provided, and the IoV includes a plurality of IoV terminals, access points, and a macro node, the access points and the plurality of IoV terminals form access point groups, and each of the access point groups is respectively connected to the macro node through the access points, and the IoV low latency communication method includes the following steps:

detect a volume of a service resource requested by the IoV terminal during a communication process;

the macro node performs global resource scheduling on the volume of the requested service resource if it is detected that the volume of the service resource requested by the IoV terminal is greater than a data block transmission threshold specified by the access point group; and the access point performs internal resource scheduling on the volume of the requested service resource within the access point group if it is detected that the volume of the service resource requested by the IoV terminal is no greater than the data block transmission threshold specified by the access point group.

Preferably, the IoV terminal enters the access point group and sends a service resource request to the access point; and the access point receives the service resource request and reports a service type of the service resource request and a volume of a requested resource to the macro node.

Preferably, the macro node collects statistics on service resource requests reported by the access point, sorts various service types on which statistics is collected in a descending order according to quantities of each service type requested by a user, selects F service types having maximum demands, and sends a cache resource configuration command to access points in each access point group according to a computed volume of a resource, and F is a positive integer.

Preferably, upon receipt of the configuration command from the macro node, each access point performs cache resource allocation for the F service types, allocates a resource block having a predetermined size for each service type, and at the same time, releases cache resources pre-scheduled in a previous cycle.

Preferably, the predetermined size $D_{aver}$ of the resource block is determined according to a following formula:

$$D_{aver} = D/M$$

D represents a total demand of each service type and M represents a quantity of users of each service type.

Preferably, in a communication process, a plurality of access points in a access point group transmits data to an IoV terminal that sends a request in a path diversity manner at the same time, and the IoV terminal receives the data in a diversity merging manner.

Preferably, during a communication process, an access point in an access point group performs data transmission with an IoV terminal in a control range of the access point in an open loop communication manner.

Preferably, when the macro node performs global resource scheduling, a close loop communication manner having an HARQ retransmission mechanism is used between the macro node and the IoV terminal.

Preferably, the macro node uses a network slicing technology to respectively put service data to be managed in two resource pools that face IoV terminals and access point groups.

Preferably, the data block transmission threshold is obtained by the access point group according to a transmission latency in a controllable range.

According to a second aspect of the embodiment of the present invention, an IoV terminal is provided and includes a processing assembly and a memory configured to store an executable instruction of the processing assembly, where the processor is configured to perform the IoV low latency communication method.

According to a third aspect of the embodiment of the present invention, an IoV system is provided and includes: a plurality of IoV terminals, access points, and a macro node, where the access points and the plurality of IoV terminals form access point groups, and each of the access point groups is respectively connected to the macro node through the access points, where the IoV terminals, the access points, and the macro node communicate by using the IoV low latency communication method.

Preferably, the access points are fog node servers.

Preferably, the macro node is a communications base station covering a wide area.

Compared with the prior art, the IoV low latency communication method provided by the present invention performs resource scheduling on services requested by an IoV terminal by using a combination of a macro node and access points, provides a pre-scheduling method for autonomously allocating cache resources, and reduces a network transmission latency and ensures reliability of data transmission through optimization of a data transmission manners, high-efficient processing of a data network side, and stable access of edge users by using technologies such as fog computing, path diversity, and network slicing.

DETAILED DESCRIPTION

The technical content of the present invention is further described in detail with reference to the accompanying drawings and specific embodiments.

In consideration of specific requirements of autonomous vehicles in a high-speed movement scenario, an embodiment of the present invention firstly provides an IoV low latency communication method. The communication method reduces a network transmission latency and ensures reliability of data transmission through optimization of a data transmission manner, high-efficient processing of a data network side, and stable access of edge users by using a pre-scheduling method for autonomously allocating cache resources in combination with technologies such as fog computing, path diversity, and network slicing. This will be specifically described below.

Figure 1:
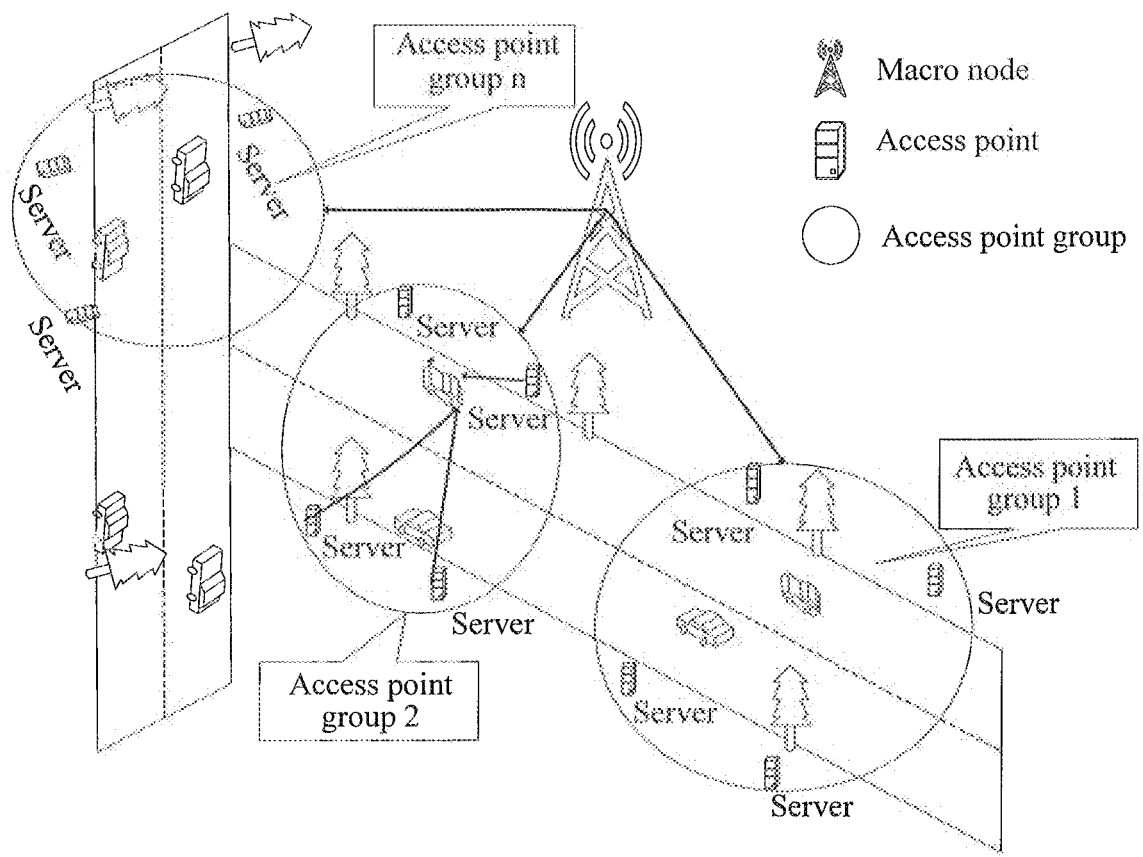
FIG. 1 is a schematic diagram of a typical application scenario of an IoV low latency communication method according to the present invention.

FIG. 1 shows a typical application scenario of an IoV low latency communication method according to the present invention. In the application scenario, an access point is arranged along a road edge at a regular interval. Several vehicles (preferably autonomous vehicles) installed with an IoV terminal and one or more access points in an area where the vehicles are located form corresponding access point groups (that is, access point group 1, access point group 2 . . . and access point group n, where n is a positive integer). Division of access point groups can be realized by using a virtual cell technology. The virtual cell technology is a common wireless networking technology and can realize virtualized access control on a quantity of access points and a control range thereof in an access point group according to connection requirements of the IoV terminal, so as to enhance access stability of the IoV terminal. The access point groups have respective control ranges according to different signal coverage ranges of the access points (greatly influenced by an architectural environment). In addition, the access point groups are respectively connected to a macro node through the access points therein, thereby forming a simplified IoV system.

In the IoV system shown in FIG. 1, communication among vehicles is finished mainly by the access points and the macro node. Each macro node manages n access point groups in a certain range, and each access point group consists of m access points. The m access points are all fog node servers joining in fog computing and together finish vehicle communication in the control range, and m and n are both positive integers.

In the present invention, a formula of a total data transmission latency D of IoV communication data is defined as:

$$D = d_{sen} + d_{trans} + d_{re} + d_{inform} \quad (1)$$

In formula (1), $d_{sen}$ represents a response latency of a sensor in a vehicle, $d_{trans}$ represents a transmission latency of data in a wireless channel, $d_{re}$ represents a latency for requesting waiting during data transmission, and $d_{inform}$ represents a latency of processing data at a receiving end.

In a close loop communication manner usually used in the prior art, $d_{re}$ mainly includes a waiting latency for data retransmission and information feedback, $d_{inform}$ is mainly generated by a control signaling and data for processing retransmission data, $d_{sen}$ is closely related to the sensor, and $d_{trans}$ is closely related to channel interference, a communication distance, and so on.

To reduce a transmission latency of network data efficiently, an open loop communication manner is used in the embodiment of the present invention. In the open loop communication manner, a channel resource for information feedback and retransmission is reduced, an access point can perform scheduling on a plurality of IoV terminals at the same time, and due to shareness of a channel resource, when the plurality of IoV terminals sends a resource request to an access point at the same time, the access point can allocate a corresponding quantity of channels according to a quantity of users, so as to realize resource scheduling of a plurality of users. In another aspect, a data transmission manner using a combination of a macro node and access nodes is used in the embodiment of the present invention. Specifically, whether a service resource is scheduled through the macro node or the access node is determined according to a volume of the service resource requested by the IoV terminal. If the volume of the requested service resource is small, the access point is selected to perform data transmission. The access points in this embodiment of the present invention are fog node servers, and their large storage capacity and high-efficient computing performance significantly improve data transmission latency performance in a small range and enhance access stability of an IoV terminal. If the volume of the requested service resource is large, the macro node is selected to perform global resource scheduling. The macro node consists of a communications base station covering a wide area and is configured to manage service data in the access point and finish scheduling of a large volume of a requested resource of the IoV terminal. The data transmission manner using a combination of a macro node and access points can resolve the problems such as a long transmission latency and unstable transmission of quick cell handover suffered by an IoV terminal in a high-speed movement scenario.

In this embodiment of the present invention, all access points in each access point group perform data transmission with IoV terminals in a control range thereof in an open loop communication manner. At the same time, each access point in the access point group performs data transmission in response to each service request from the IoV terminal by using a path diversity technology. The access points in each access point group are not in a cooperative relationship, but are independent of each other, so as to ensure reliability of data communication.

Figure 2:
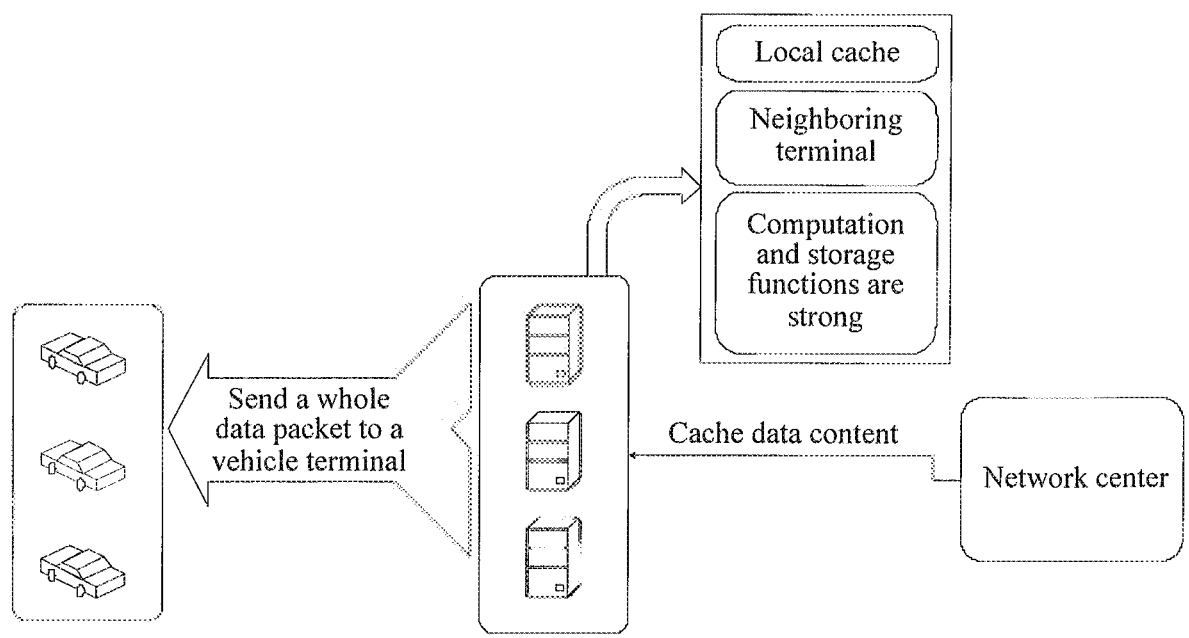
FIG. 2 is a schematic diagram of resource scheduling performed by an access point on an IoV terminal.

In the IoV system, a process of performing resource scheduling on the IoV terminal by the access points is shown in FIG. 2 and specifically includes the following steps (may operate in a random order): caching content data sent by the macro node (a network center) and sending a whole data packet to each IoV terminal. In the prior art, the commonly used LTE D2D technology efficiently resolves the problem that access of an edge user of a mobile network is unstable. In an embodiment of the present invention, a fog node server is used as an access point and a distributive transmission manner is used to replace the conventional LTE D2D technology, so as to enhance access stability of edge users efficiently.

Using the fog node server as the access point has the following advantages.

1) Local cache: when an IoV terminal accesses a local resource, the local cache can run independent of other parts of a network.

2) Neighboring terminal: a neighboring terminal is near the IoV terminal and can greatly reduce a transmission latency, so as to increase a response speed of a service, thereby improving user experience.

3) Strong computation and storage functions: the fog node server has strong computation and storage capability and provides more abundant service possibility and flexibility for the IoV.

4) A data transmission range of an access point group can be enlarged, and resource scheduling can be finished without using the network side, thereby reducing a whole network latency.

Wireless communication in a high-speed movement scenario uses an open loop communication manner, and data retransmission is cancelled when resource scheduling is performed, that is, a sending terminal needs to send service data requested by an IoV terminal for only once, and a receiving terminal only needs to confirm reception, so reliability of data transmission cannot be ensured. Therefore, in the embodiment of the present invention, when an IoV terminal installed on a vehicle receives a signal, a path diversity technology is used to ensure integrity of the signal.

Figure 3:
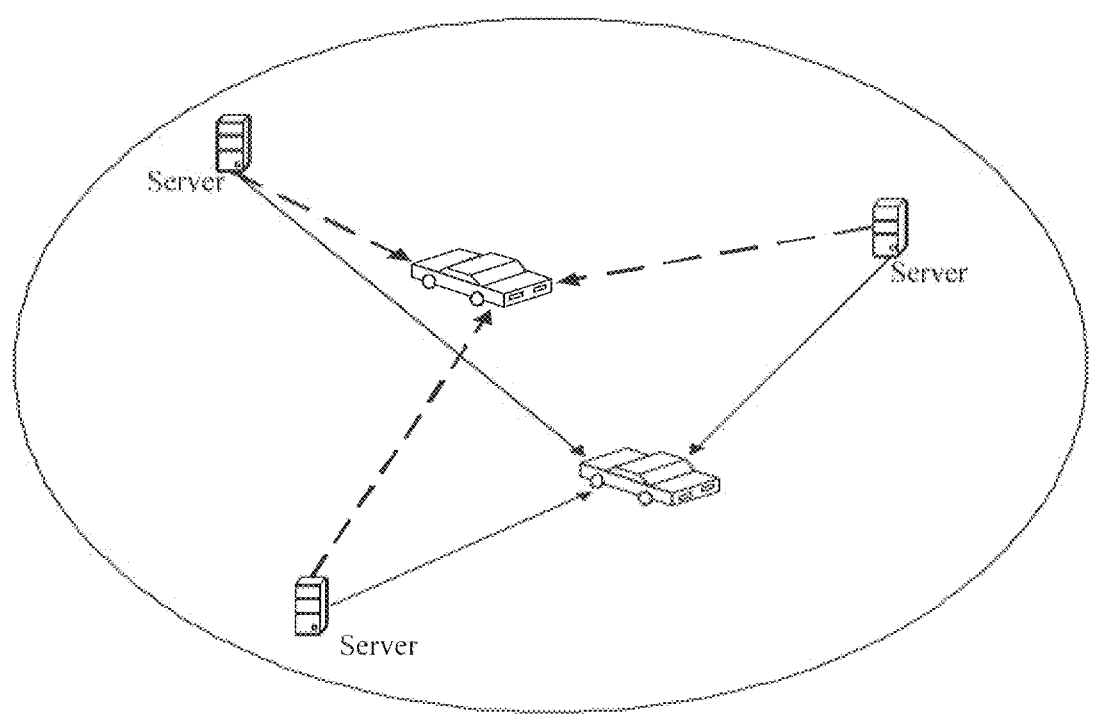
FIG. 3 is a schematic diagram of path diversity of an access point in an access point group.

As shown in FIG. 3, the access point group of the IoV system uses the path diversity technology to perform data transmission with the IoV terminal. FIG. 3 is a schematic diagram of data transmission performed between access points and IoV terminals in a control range of the access points in an access point group. Since the density of IoV terminals is low in a high-speed movement scenario and a transmission channel will not suffer a big obstacle, channel interference in each access point group in the scenario is not strong and each access point in the access point group performs no interaction as an independent part during a data transmission process. When receiving a request from an IoV terminal, each access point performs resource scheduling and data transmission for the IoV terminal at the same time, and finally, the IoV terminal receives data in a diversity merging manner. The path diversity technology can efficiently enhance reliability of data transmission.

Figure 4:
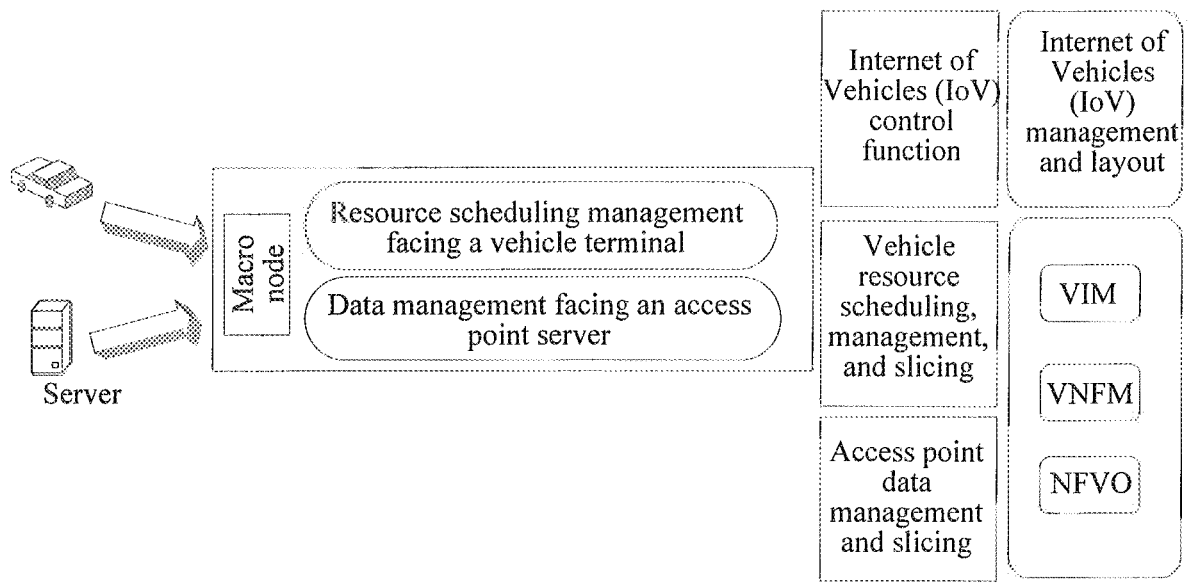
FIG. 4 is a schematic diagram of resource management performed by a macro node by using a network slicing technology.

As shown in FIG. 4, the macro node uses a network slicing technology based on Network Function Virtualization (NFV) and Software Defined Network (SDN). The macro node has two main tasks. One task is that when a data volume of a resource requested by an IoV terminal is greater than a data transmission volume threshold in a control range of an access point group to which the access point belongs (a size of the data block is obtained by each access point group according to a transmission latency in a controllable range), global resource scheduling is performed for a resource request of the IoV terminal, thereby ensuring quick handover performance in a high-speed movement scenario. The other task is that centralized management is performed on data of n access point groups in a wide area range, and therefore, the network slicing technology may be used to perform virtual slicing management on the two types of data, service data to be managed is divided in two parts that face the access point group and the IoV terminal and respectively put in two resource pools that face the access point group and the IoV terminal, and then, management and layout of virtualized layers and hardware resource layers are finished through management and layout functions of the IoV, thereby implementing mapping between a virtual network and a hardware resource and management on a service resource process.

The macro node applies the network slicing technology on service data to enhance flexibility of data processing and processing capability and significantly reduce a data processing latency, thereby reducing a transmission latency of the whole service data.

In an IoV application scenario shown in FIG. 1, assuming that a vehicle just drives into a control range of an access point group 2 and sends a related service request (including webpage, music, video, and the like), if m access points in the access point group 2 detect that the service resource volume requested by the vehicle is no greater than a data block transmission threshold a specified by the access point group 2, all the access points together perform internal resource scheduling on the vehicle that requests for a resource. If the m access points detect that the service resource volume requested by the vehicle is greater than the data block transmission threshold specified by the access point group 2, the access points perform global resource scheduling on the vehicle through the macro node. The network coverage range of the macro node is wide, the quick handover problem in the high-speed movement scenario is readily resolved.

Figure 5:
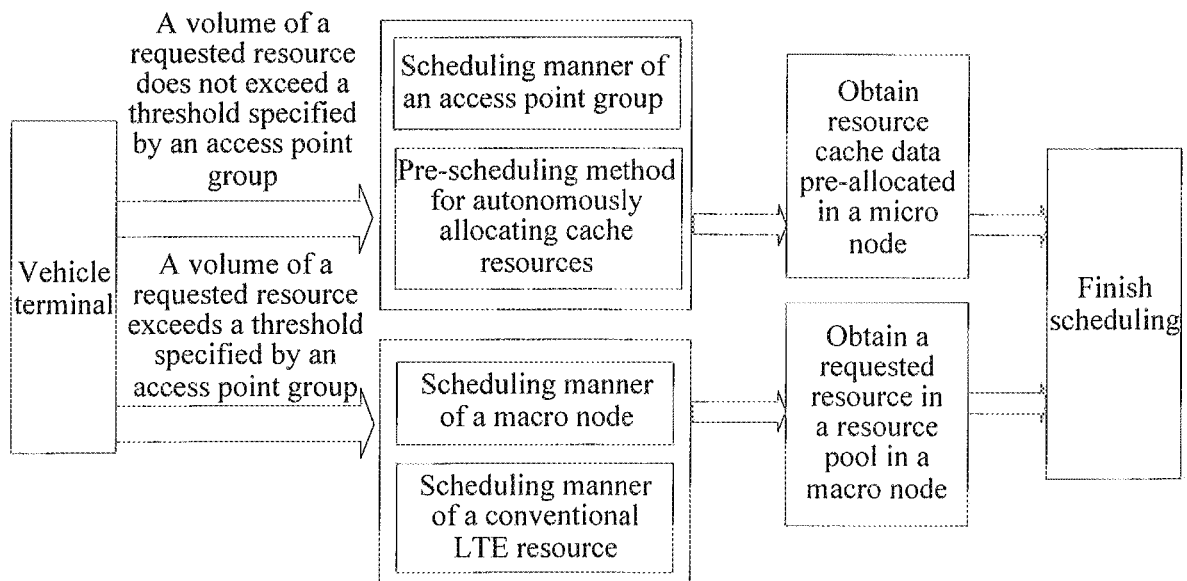
FIG. 5 is a block diagram of global resource scheduling realized by the macro node and the access point group.

In the conventional LTE-based IoV technical solution, allocation of cache resources is usually unchanged, causing waste of a large amount of resources. Different resource scheduling manners are used for the macro node and the access point groups in this embodiment of the present invention, so as to enhance resource scheduling efficiency. As shown in FIG. 5, if an IoV terminal requests a large volume of service resources in a high-speed driving situation, and data transmission cannot be finished within a data transmission latency specified by the access point group, it is assumed that the volume of service resources requested by the IoV terminal is detected to be greater than a data block transmission threshold specified by the access point group (a size of the data block is obtained by each access point group according to a transmission latency in a controllable range), the macro node performs global resource scheduling in a conventional LTE resource scheduling manner. If the volume of requested service resources is small (no greater than the data block transmission threshold specified by the access point group), the access point group performs internal scheduling by using a pre-scheduling method for autonomously allocating cache resources. In this way, the IoV terminal can implement global resource scheduling in a high-speed scenario, thereby further reducing a network latency.

The pre-scheduling method for autonomously allocating cache resources includes performing operations of a macro node and access nodes, using both centralized management of the macro node and distributive control of each access point to finish pre-scheduling of user resources, thereby not only avoiding waste of resources, but also reducing a network latency. The method is specifically described as follow: 1. the macro node uses a quick sorting algorithm to collect statistics, computes pre-scheduled cache resources of each access point and sends a cache resource allocating instruction periodically, the data that is computed and collected includes service types requested by the terminal, volumes of each service type, and a quantity of IoV terminals, and 2. the access point finishes resource scheduling on the vehicle, the volume of the scheduled resources is no greater than a data transmission threshold specified by the access point group, for example, a webpage request, a surrounding environment, a road condition, and a vehicle density.

Figure 6:
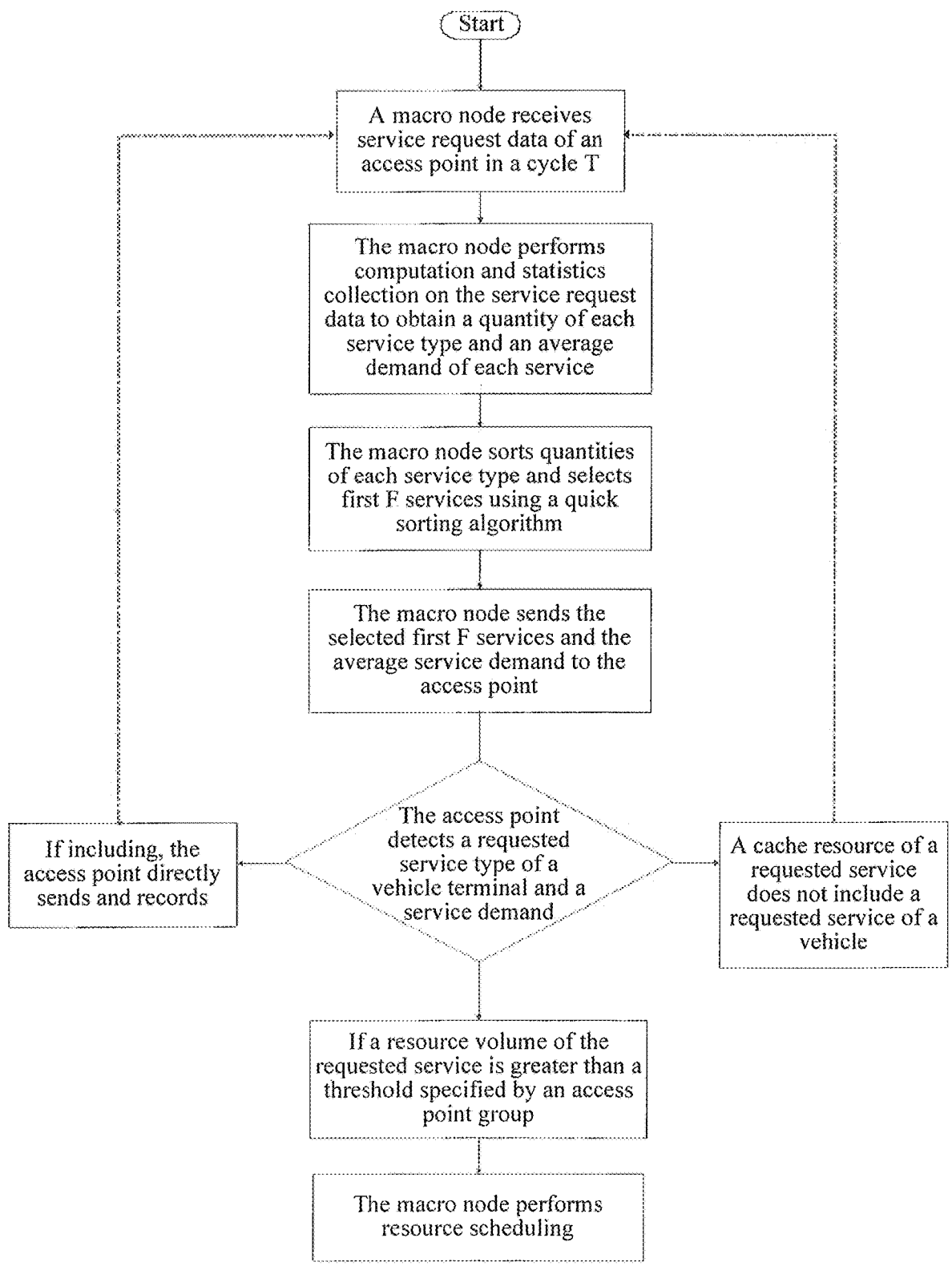
FIG. 6 is a flowchart of a pre-scheduling method for autonomously allocating cache resources in an access point group.

As shown in FIG. 6, the pre-scheduling method is used to implement resource scheduling in the access point group, and specifically includes the following steps.

1) When the vehicle enters an access point group and begins to send a service resource request, a new cycle T begins. The access points in the access point group receive the service resource request of the IoV terminal, and reports a service type and a volume of a requested resource of the service resource request to the macro node (at this time, not report the whole resource request to the macro node). The macro node receives service resource request data sent by each access point.

2) The macro node collects statistics of the service resource request data reported by the access points to obtain a total quantity of service types (N is a positive integer, similarly hereinafter), a total number D of resources corresponding to each service type, a quantity M of terminals (M is a positive integer, similarly hereinafter), and a volume $D_{aver}$ of a resource corresponding to each service type.

In an embodiment of the present invention, each macro node manages different access point groups. The service types of all requested data of the IoV terminals in the controllable access point groups are counted every one circle, and an average volume of resources of each service type is computed according to the following formula:

$$D_{aver}=D/M \qquad (2)$$

In the formula (2), $D_{aver}$ represents an average user demand of each service type, D represents a total demand of each service type, and M represents a quantity of users of each service type.

The macro node sorts the N service types on which statistics has been collected in a descending order according to the count of each service type requested by the users, selects F service types (F is a positive integer, similarly hereinafter) having maximum demands, and according to the volume of computed resources, sends a cache resource configuration command to the access points in each access point group. After receiving the command, each access point performs resource caching and allocation on the F service types, each service type being a resource block the size of which is $D_{aver}$, and at the same time, releases the pre-scheduled cache resource of the previous cycle T. In addition, data management of the macro node can also be implemented by centralized management mode of cloud computing.

3) The macro node uses a quick sorting algorithm to sort the statistical results of different service types and selects the first F service types.

4) The macro node sends the selected F service types and the corresponding $D_{aver}$ to different access point groups.

Specifically, the macro node counts the service types of all requested data of the IoV terminals in the access point groups, and collects statistics on average volumes of resources of each service type according to the following formula (2). The macro node sorts the N service types on which statistics has been collected in a descending order according to a quantity of each service type requested by the users, selects F service types having maximum demands, and according to the computed volume of resources, sends a cache resource configuration command to the access points in each access point group.

It should be noted that, operations such as statistics collection of and computation the access point can also be finished in an access point that are based on the fog node server. However, this will increase data processing burden of the access point and influences the whole data transmission latency.

5) The access point detects a requested service type and a service demand of the IoV terminal, if the cache resource of the requested service does not include the service requested by the vehicle, return to step 1), if the cache resource of the requested service includes the service requested by the vehicle, the access point directly sends and records and then returns to step 1), and if the resource volume of the requested service is greater than a data block transmission threshold specified by the access point group, the macro node performs global resource scheduling.

Specifically, after receiving a configuration command of a pre-scheduled cache resource from the macro node, each access point performs cache resource allocation on the F service types, allocates a resource block a size of which is $D_{aver}$ for each service type, releases the pre-scheduled cache resource of the previous cycle T, and realizes multi-user resource pre-scheduling in the open loop communication manner. The multi-user resource pre-scheduling refers to that, according to the shareness of channel resources, when a plurality of users sends a resource request to the access points, the access points allocate a corresponding quantity of channels according to a quantity of users, so as to realize resource scheduling of the plurality of users. The scheduled resources include resources in the data transmission threshold specified by the access point group, such as a webpage request, a surrounding environment, a road condition, and a vehicle density.

It should be noted that, each access node can, as a fog node server, perform resource scheduling on vehicles in a controllable range. If a vehicle can finish data receiving and transmitting in each access point group, handover does not need to be considered, and the low-latency and high-reliable data transmission of the vehicle can be implemented in the access point group.

Next, the macro node begins to compute and collect statistics on service resource request data in a next cycle T and begins the foregoing process again, so that the cycle repeats.

The global resource scheduling at the macro node end uses a close loop communication manner having an HARQ retransmission mechanism, a data transmission solution is to perform retransmission on data that is detected by a receiving end to have errors based on feedback information of a receiving end. The HARQ retransmission mechanism requires a receiver and a sender to send an acknowledgement messages to ensure successful data transmission. Since the macro node cannot perform data transmission on the IoV terminal by using a path diversity manner, a high error rate is definitely caused if an open loop communication manner is used.

Compared with the prior art, the IoV low latency communication method provided by the present invention performs resource scheduling on a service requested by an IoV terminal by using a combination of a macro node and access points, thereby achieving an objective of reducing a data transmission latency in terms of data transmission, data processing, and resource pre-scheduling. Specifically, the macro node performs network slicing on data that faces IoV terminals and access point groups, puts the data into two resource pools, performs layout and management and realizes high-efficient management of network-side data. The access point group uses an open loop communication technology of path diversity to perform data transmission on vehicles and improve reliability of data transmission. The macro node uses a quick sorting algorithm to perform computation and statistics collection on the resource situation of the access point and sends a cache resource allocation instruction to the access point regularly, the access point receives the instruction to perform cache resource allocation and realizes resource scheduling on the IoV terminal.

Figure 7:
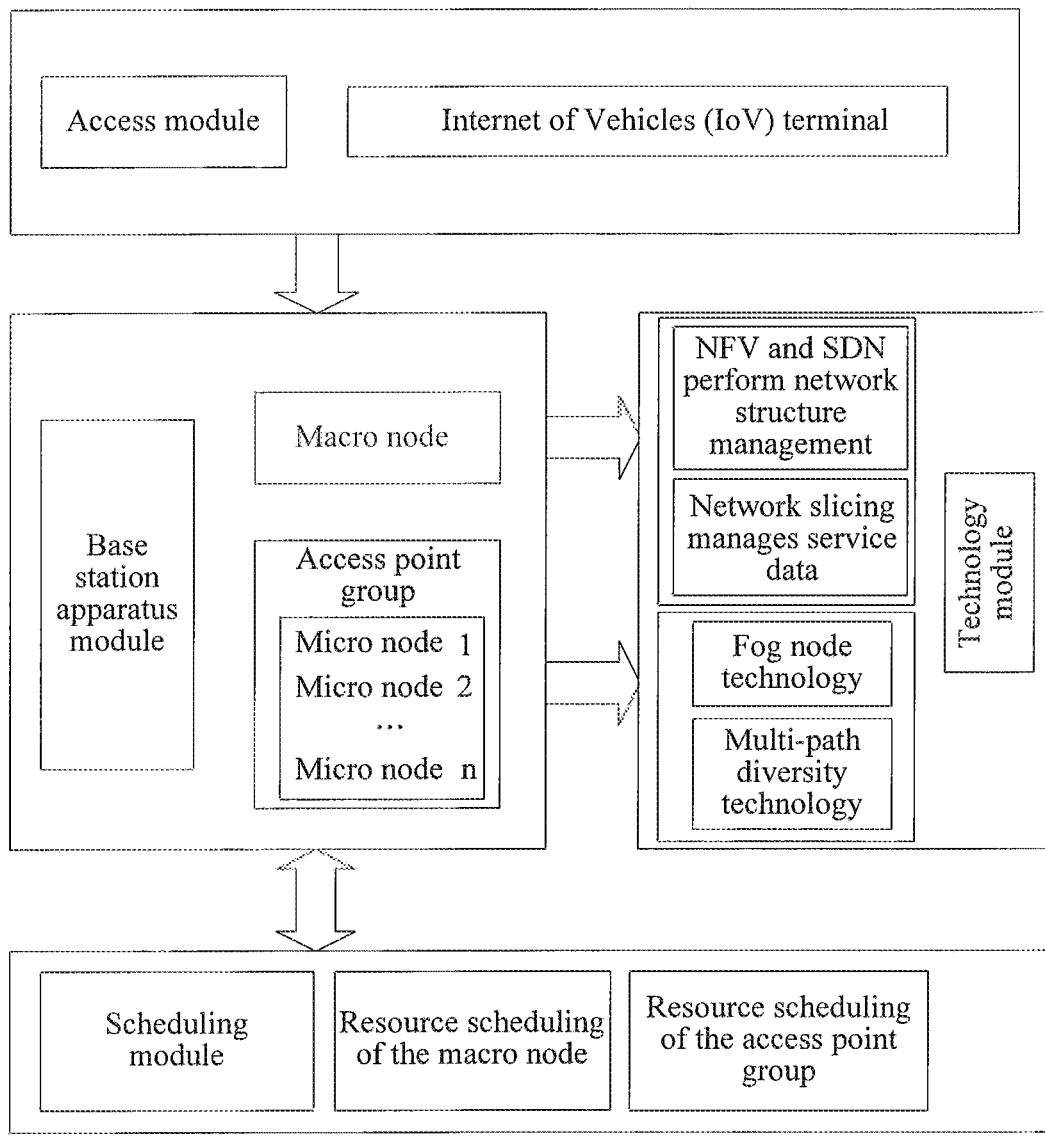
FIG. 7 is a schematic structural diagram of an IoV system using an IoV low latency communication method.

As shown in FIG. 7, an embodiment of the present invention further provides an IoV system using the IoV low latency communication method. The IoV system includes a plurality of IoV terminals, access points and a macro node. The vehicles installed with the IoV terminal and m access points in the area thereof form corresponding access point groups (that is, access point group 1, access point group 2, . . . access point group n, m and n are positive integers), and m access points are all fog node servers joining in fog computing. Each access point group is respectively connected to the macro node through the access points therein. Each macro node consists of a communication base station covering a wide area and manages a plurality of access point groups in a certain area. In an embodiment shown in FIG. 7, the IoV terminal is connected to a corresponding access point through a 4G/5G access module and each access node is a fog node server. The corresponding macro node has a 4G/5G base station apparatus module, so as to support 4G/5G communication between the macro node and each access point group. The macro node and the corresponding access point group use a fog computing technology, a multi-path diversity technology, and an NFV and SDN-based network slicing technology to perform management and transmission of service data. In addition, a corresponding resource scheduling module is further arranged in the IoV system. The resource scheduling module can be realized by a computer or a server, and is used to implement the IoV low latency communication method terminal, so as to implement a resource scheduling manner through a combination of the macro node and the access point group. In an embodiment of the present invention, the resource scheduling module can be arranged independently or arranged together with the access point or the macro node as one part thereof.

Figure 8:
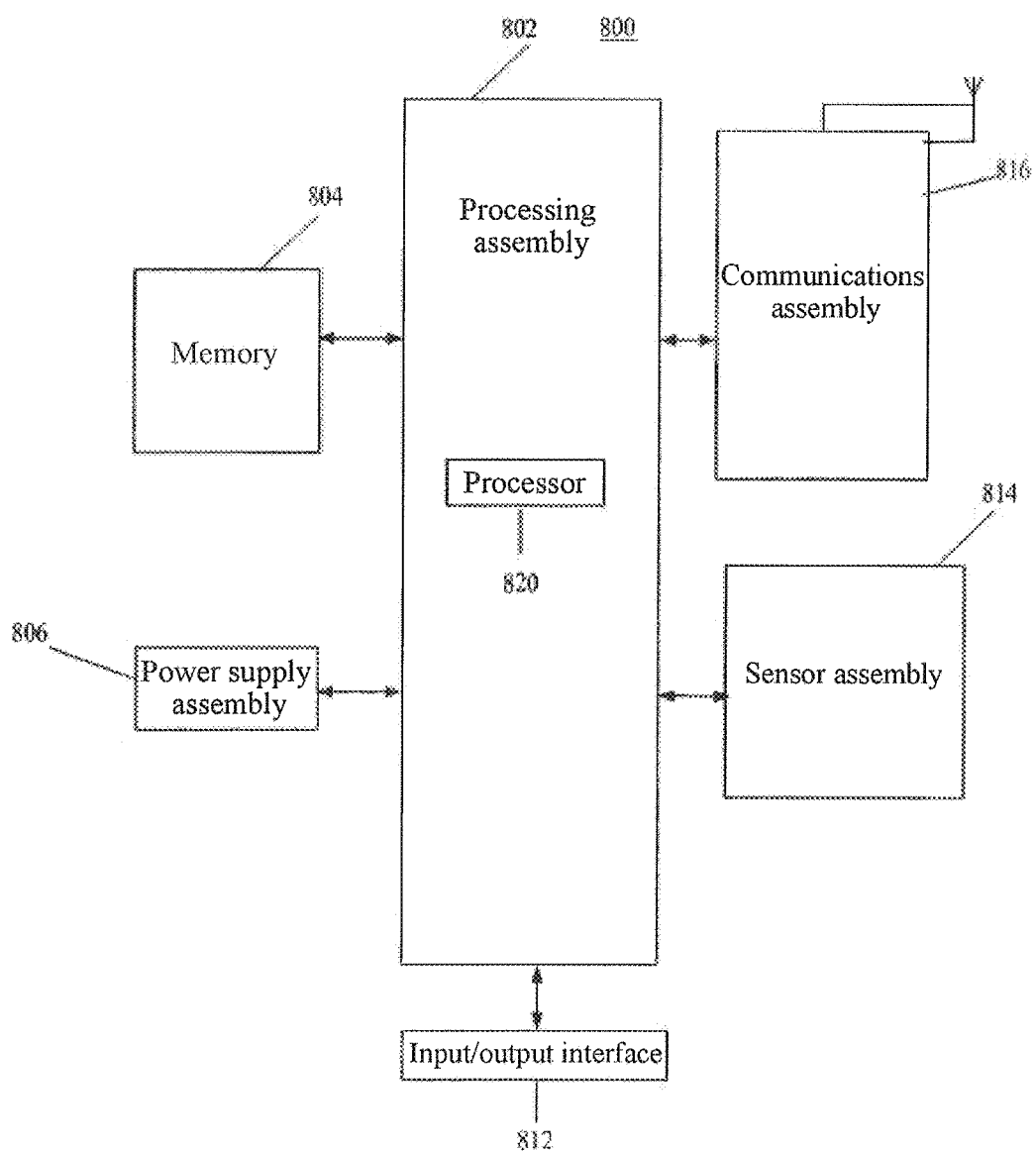
FIG. 8 is a structural block diagram of an IoV terminal according to an embodiment of the present invention.

FIG. 8 is a structural block diagram of an IoV terminal according to an embodiment of the present invention. Referring to FIG. 8, the IoV terminal 800 can include one or more of following assemblies: a processing assembly 802, a memory 804, a power supply assembly 806, an input/output interface 812, a sensor assembly 814, and a communications assembly 816.

The processing assembly 802 usually controls the whole operation of the IoV terminal 800. The processing assembly 802 can include one or more processors 820 to execute an instruction, so as to finish all or a part of steps of the foregoing method. Furthermore, the processing assembly 802 can include one or more modules, so as to interact with other assemblies.

The memory 804 is configured to store various types of data to support operations of the IoV terminal 800. The examples of the data include instructions of any application program or a method applied on the IoV terminal 800. The memory 804 can be implemented by any type of volatile or non-volatile storage devices or a combination thereof, such as a static random access memory (SRAM), an electrically erasable programmable read-only memory (EPROM), an erasable programmable read-only memory (EPROM), a programmable read-only memory (PROM), a read-only memory (ROM), a magnetic memory, a flash memory, a magnetic disc, or an optical disc.

The power supply assembly 806 provides electric power for various assemblies of the IoV terminal 800. The power supply assembly 806 can include a power supply management system, one or more power supplies, and other assemblies for generating, managing, and allocating power for the IoV terminal 800. The I/O interface 812 provides an interface between the processing assembly 802 and an peripheral interface module, and the peripheral interface module can be a keyboard, a roller, or a button.

The sensor assembly 814 includes one or more sensors and is used to provide status estimation of each aspect for the IoV terminal 800. In some embodiments, the sensor assembly 814 can include an acceleration sensor, a gyroscope sensor, a magnetic sensor, a pressure sensor or a temperature sensor.

The communications assembly 816 is configured to facilitate wired or wireless communication between the IoV terminal 800 and other devices and is preferably a 4G/5G access module. The IoV terminal 800 can access a communications standard-based wireless network, such as WiFi, 4G/5G, or a combination thereof.

In an exemplary embodiment, the IoV terminal 800 can be implemented as one or more application specific integrated circuits (ASIC), digital signal processors (DSP) a digital signal processing devices (DSPD), programmable logic devices (PLD), field programmable gate arrays, controllers, micro-controllers, microprocessors or other electronic elements, so as to perform the IoV low latency communication method.

The IoV low latency communication method, the terminal, and the system provided by the present invention are described in detail as stated above. Any obvious change made by a person skilled in the art without departing from the substantive spirit of the present invention will infringe the patent right of the present invention and shall bear corresponding legal responsibilities.

What is claimed is:

1. An Internet of Vehicles (IoV) low latency communication method, the IoV comprising a plurality of IoV terminals, access points, and a macro node, the access points and the plurality of IoV terminals forming access point groups, and each of the access point groups being respectively connected to the macro node through the access points, comprising:
   sending a service resource request to an access point by an IoV terminal that enters an access point group in a high-speed driving situation;
   receiving, by the access point, the service resource request and reporting a service type of the service resource request and a volume of a service resource requested to the macro node;
   collecting, by the macro node, statistics on service resource requests reported by the access point, sorting various service types on which statistics is collected in a descending order according to quantities of each service type requested by a user, selecting F service types having maximum demands, and sending a cache resource configuration command to access points in each access point group according to a computed volume of a resource periodically, and F being a positive integer; upon receipt of the cache resource configuration command from the macro node, each access point performing cache resource allocation for the F service types, allocateing a resource block having a predetermined size for each service type, and at the same time, releaseing a cache resource pre-scheduled in a previous cycle;
   detecting, by the access point, a volume of a service resource requested by the IoV terminal during a communication process;
   performing, by the macro node, global resource scheduling on the volume of the service resource requested if it is detected that the volume of the service resource requested by the IoV terminal is greater than a data block transmission threshold specified by the access point group; and performing, by the access point, internal resource scheduling on the volume of the service resource requested within the access point group if it is detected that the volume of the service resource requested by the IoV terminal is no greater than the data block transmission threshold specified by the access point group.

2. The IoV low latency communication method according to claim 1, wherein
   the predetermined size $D_{aver}$ of the resource block is determined according to a following formula:

$$D_{aver}=D/M$$

D represents a total demand of each service type and M represents a quantity of users of each service type.

3. The IoV low latency communication method according to claim 1, wherein
   in a communication process, a plurality of access points in a access point group transmits data to an IoV terminal that sends a request in a path diversity manner at the same time, and the IoV terminal receives the data in a diversity merging manner.

4. The IoV low latency communication method according to claim 1, wherein
   during a communication process, an access point in an access point group performs data transmission with an IoV terminal in a control range of the access point in an open loop communication manner.

5. The IoV low latency communication method according to claim 1, wherein
   when the macro node performs global resource scheduling, a close loop communication manner having an HARQ retransmission mechanism is used between the macro node and the IoV terminal.

6. The IoV low latency communication method according to claim 1, wherein
   the macro node uses a network slicing technology to respectively put service data to be managed in two resource pools that face IoV terminals and access point groups.

7. The IoV low latency communication method according to claim 1, wherein
   the data block transmission threshold is obtained by the access point group according to a transmission latency in a controllable range.

8. An Internet of Vehicles (IoV) terminal, comprising a processing assembly and a memory configured to store an executable instruction of the processing assembly, wherein the processor is configured to perform the IoV low latency communication method according to claim 1.

9. An Internet of Vehicles (IoV) system, comprising a plurality of IoV terminals, access points, and a macro node, wherein the access points and the plurality of IoV terminals form access point groups, and each of the access point groups is respectively connected to the macro node through the access points, wherein:
   the IoV terminals, the access points, and the macro node communicate by using the IoV low latency communication method according to claim 1.

10. The IoV system according to claim 9, wherein:
    the access points are fog node servers.

11. The IoV system according to claim 9, wherein:
the macro node is a communications base station covering a wide area.
12. The IoV system according to claim 9, wherein:
the IoV terminal is connected to the access points in the access point group through a 4G/5G access module.

* * * * *